Figure 1:
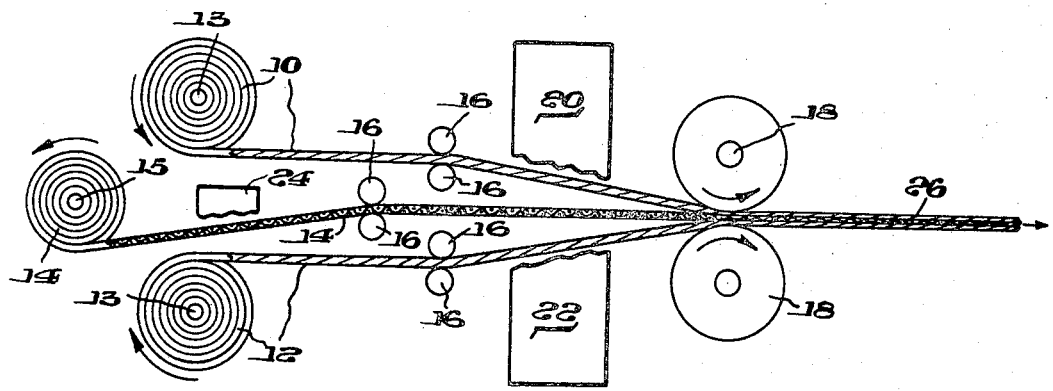

Oct. 22, 1968  S. A. MULDOVAN  3,406,446
METHOD OF MANUFACTURING LAMINATED METAL PANEL
Filed Oct. 29, 1963

INVENTOR.
STEPHEN A. MULDOVAN.
BY Stanley J Price
HIS ATTORNEY.

United States Patent Office 3,406,446
Patented Oct. 22, 1968

3,406,446
METHOD OF MANUFACTURING LAMINATED
METAL PANEL
Stephen A. Muldovan, 1080 Willowdale Road,
Morgantown, W. Va. 26505
Filed Oct. 29, 1963, Ser. No. 319,765
4 Claims. (Cl. 29—497.5)

This invention relates to a laminated metal panel and method of manufacturing the same, and more particularly to a laminated metal panel wherein sheets of relatively lightweight metal are given added strength and resiliency by laminating them with a wire mesh screen having suitable characteristics.

Modern metallurgy has produced a great number of lightweight metal alloys which are suitable for many of the manufacturing techniques of modern industry. The lightweight metal alloys can be fabricated into commercially usable objects easily and quickly. Of these metals, aluminum alloy is probably the most widely used and adopted.

The present invention is directed to the method of producing a laminated metal panel which uses the lightweight alloys of modern metallurgy in sheet form. These lightweight sheets are corrosion resistant, flexible, and have ready fabricating qualities.

The lightweight metal sheets, however, are often not structurally strong enough or resilient enough to be utilized in many large metal fabrications. For example, the lightweight sheet material is often not sufficiently rigid to be utilized in a vehicle or truck panels, as panels for storage hoppers, or to fabricate floors, stairs, platforms, or the like, in industrial and commercial buildings.

Utilizing the method of the present invention, a laminated panel may be formed from relatively lightweight sheet material and a reinforcing wire mesh screen so that the finished panel has the non-corrosive characteristics and ready fabricating characteristics of the lightweight metal sheets, but is sufficiently rigid and resilient to serve as a structural member where strength, rigidity and resilience are required.

In practicing the present invention, a standard wire mesh screen formed of stainless steel, or carbon steel, is utilized to provide the desired resiliency and structural strength to a laminated panel. By the novel method of the present invention, the wire mesh screen is firmly embedded between the relatively lightweight metal sheets so that it forms a structural part of the sheets and lends its added resiliency and strength to the sheets.

Throughout this specification, aluminum alloy sheets will be referred to interchangeably with lightweight metal sheets. It will be understood that the lightweight metal sheets can be other than aluminum, or aluminum alloy without departing from the scope of this invention. Likewise, the mesh center lamination can be formed from materials other than steel, so long as they have the proper characteristics of strength and rigidity.

With the foregoing considerations in mind, it is an object of the present invention to provide a laminated metal panel which has exterior surfaces formed of a relatively lightweight, non-corrosive metal, but which is stronger and more resilient than the lightweight metal.

Another object of the present invention is to provide a novel method of manufacture of a laminated metal panel.

An other object of the present invention is to provide a method of manufacture of a metal panel which may be used on a continuous manufacturing process, or which may be utilized to form panels on an individual basis.

Another object of this invention is to produce a laminated panel wherein the member providing the structural strength and resiliency is completely encased in lighter weight, non-corrosive, exterior metal sheets.

These and other objects of this invention will become apparent as this description proceeds in conjunction with the accompanying drawing.

Figure 2:
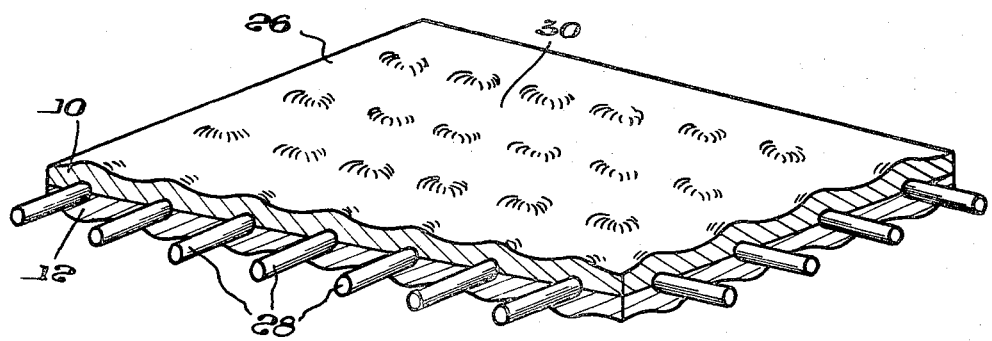

In the drawing:
FIGURE 1 is a schematic drawing of the method of manufacturing a laminated panel of the present invention.
FIGURE 2 is a perspective view of a portion of the finished laminated panel.

Referring to FIGURE 1, an aluminum alloy sheet 10 and aluminum alloy sheet 12 are stored on rolls 13. A steel wire mesh screen 14 is stored upon a roll 15. The aluminum alloy sheets 10 and 12, and the steel wire mesh screen 14 are extended from the rollers 13 and 15 respectively through guide means 16. The guide means 16 guide the aluminum alloy sheets 10 and 12 and the wire mesh screen 14 between a pair of mill rollers 18.

The mill rollers 18 are of the type found in a conventional metal rolling mill. The mill rollers 18 are spaced so that, depending upon the gauge of the aluminum alloy sheets 10 and 12 and the wire diameter of the steel mesh screen 14, the rolls 18 exert a compressive force on the sheets and the steel wire mesh screen as the sheets and the screen pass between the rollers 18.

Heaters 20, 22, and 24 are provided to heat the aluminum sheets 10 and 12 and the wire mesh screen 14, respectively. The heaters may be of any conventional construction, and their exact form is not a part of the present invention. The heaters 20, 22, and 24 may be utilized simultaneously or, with some variations of the method of producing the laminated panel, heaters 20 and 22 may be utilized to heat the aluminum alloy sheets 10 and 12 while the steel wire mesh screen 14 is not heated. In other variations of the production method, the steel wire mesh screen 14 may be heated by heater 24 while the exterior sheets 10 and 12 of the panel are not heated.

After the aluminum alloy sheets 10 and 12 and the wire mesh screen 14 pass between the rollers 18, a laminated metal panel 26 is formed.

Referring to FIGURE 2, the laminated panel 26 is shown in greater detail. The aluminum alloy sheets 10 and 12, upon heating, are deformed over the wire mesh screen 14 which has the individual wires 28 shown in detail in FIGURE 2. The aluminum alloy sheets 10 and 12 contact each other through the interstices formed by the network of individual wires of the steel mesh screen 14. Because of the heated condition of the exterior sheets 10 and 12, the contact of the individual sheets 10 and 12 with each other through the interstices of the screen 14 causes the sheets 10 and 12 to form a solid-phase bond between the individual sheets 10 and 12. Accordingly, the wire mesh screen 14 is firmly embedded between the sheets 10 and 12 and cannot move relative thereto.

With the foregoing general arrangement of the laminated panel and the method of producing the laminated panel in mind, the following specific examples of the practice of this invention can be considered:

EXAMPLE I

Sheets of aluminum alloy strip each having a thickness of .025 inch are placed upon rolls 13 so that sheets 10 and 12 have the aforesaid thickness. A stainless steel wire mesh screen formed from wires having an individual wire diameter of .025 inch and having a ½ inch distance between the individual wires in each direction is placed upon roller 15 so that the wire mesh screen 14 has the aforesaid characteristics.

The heater 24 is utilized to heat the aforesaid wire mesh screen to a temperature of 1500° F. The aluminum alloy sheets 10 and 12 remain unheated until contacting the wire mesh screen 14. The sheets 10 and 12 and the wire mesh screen 14 are guided through guide members 16 between rollers 18. The heat from the stainless steel mesh screen is transferred to the aluminum sheets 10 and 12 and they become semi-plastic as they pass between the rolls 18.

The pressure exerted on the sheets 10 and 12 and the wire mesh screen 14 by the rolls 18 causes the semi-plastic sheets 10 and 12 to be deformed around the individual wires 28 of the screen 14. The semi-plastic sheets 10 and 12 contact each other through the interstices formed by the network of individual wires 28 of the mesh screen 14. Upon contact of the sheets 10 and 12 with each other, a solid-phase bond is formed between the two sheets, thereby embedding the wire mesh screen within the laminated panel 26. The wire mesh screen cannot move relative to the outer sheets 10 and 12, and the wire mesh screen lends its rigidity to the laminated panel.

EXAMPLE II

As a second example of the present invention, aluminum alloy sheets 10 and 12 that have a thickness of .15 inch are placed upon rollers 12. A carbon steel wire mesh screen 14 having individual wire diameters of .25 inch and having a mesh opening of 1 inch square is placed upon roller 15.

Prior to placing the wire mesh screen 14 on the roller 15, the carbon steel mesh screen 14 undergoes a pickling process to insure that the carbon steel wire mesh is free from rust and oil. The sheets 10 and 12 and the mesh screen 14 are directed through guide members 16 to rollers 18. The aluminum alloy sheets 10 and 12 are heated by heaters 20 and 22 respectively, to a temperature of 650° F. The sheets 10 and 12 and the wire mesh screen 14 are then directed between rollers 18 where they are compressed together to form the laminated panel 26.

Again, the aluminum alloy sheets 10 and 12 are bonded to each other through the interstices in the wire mesh screen 14.

*General invention*

The present invention can be practiced on a continuous basis, as described in the foregoing examples. Individual laminated panels of a predetermined size can also be formed in hydraulic presses by placing a first sheet of material in the press, placing the wire mesh screen on top of the first sheet, and placing the second sheet on top of the wire mesh screen. The hydraulic press then forces the heated sheets together to form the solid-phase bond between the sheets.

In utilizing either hydraulic presses or the rolls 18, sufficient pressure is exerted on the exterior lightweight metal sheets to form the solid-phase bond under the semi-plastic conditions of the sheets after heating.

The present invention can be practiced by utilizing aluminum alloy strip sheets of any thickness ranging from .006 inch to .300 inch. The wire mesh screen can be formed from wire having a diameter anywhere between .006 inch and .300 inch. The mesh opening of the screen can vary from 1/16 inch between wires to 1 inch or more between the individual wires. The wire mesh screen, when heated to a temperature of from 1200° F. to 1500° F. and placed into contact with the aluminum alloy strip sheets causes the sheets to become semi-plastic. Likewise, if the sheets themselves are directly heated to a temperature from 500° F. to 700° F., they become semi-plastic.

The laminated panel of the present invention and the method of producing the laminated panel are novel arrangements for structurally increasing the strength and resiliency of lightweight metal panels, such as aluminum alloy, in the fabricating industry. When the laminated panel is utilized as flooring, the somewhat corrugated nature of the outer surface of the laminated panel, as illustrated in FIGURE 2, provides a natural resistance against slipping when persons walk thereon.

According to the provisions of the patent statutes, I have explained the principle, preferred construction and mode of operation of my invention, and have illustrated and described what I now consider to represent its best embodiments. However, I desire to have it understood that, within the scope of the appended claims, the invention may be practiced otherwise than as specifically illustrated and described.

I claim:

1. The method of manufacturing a laminated metal panel comprising the steps of:
   (a) placing a wire mesh screen with a mesh opening of from 1/16 to 1 inch formed of a first metal selected from the group consisting of stainless steel and carbon steel between two solid sheets formed of a second metal selected from the group consisting of aluminum and aluminum alloys;
   (b) heating said wire mesh screen to an elevated temperature between 1200° F.–1500° F. so that upon contact with said two solid sheets said sheets become semiplastic;
   (c) applying pressure on the outer surfaces of said sheets to force them toward each other while in said semi-plastic state so that said sheets contact each other through the interstices in said wire mesh screen; and
   (d) thereafter allowing said sheets to cool to form solid phase bonds between said sheets at the points of contact between said sheets.

2. The method of manufacturing a laminated metal panel as described in claim 1 wherein said wire mesh screen is formed of stainless steel and said solid sheets are formed of aluminum alloy.

3. The method of manufacturing a laminated metal panel as described in claim 1 wherein said wire mesh screen is formed of carbon steel and said solid sheets are formed of aluminum alloy.

4. The method of manufacturing a laminated metal panel comprising the steps of:
   (a) placing a wire mesh screen formed of a first metal selected from the group consisting of stainless steel and carbon steel having a wire diameter of from .006 inch to .300 inch and a mesh opening of from 1/16 to 1 inch between two solid sheets of aluminum alloy, said aluminum alloy sheets being from .006 inch to .300 inch in thickness;
   (b) heating said wire mesh screen to a temperature of between 1200° F. to 1500° F. so that upon contact with said aluminum alloy sheets, said sheets become semi-plastic;
   (c) applying pressure on the outer surfaces of said sheets to force them toward each other while in said semi-plastic state so that said sheets contact each other through the interstices in said wires mesh screen; and
   (d) thereafter allowing said sheets to cool to form solid phase bonds between said sheets at the points of contact between said sheets.

References Cited

UNITED STATES PATENTS

| | | | |
|---|---|---|---|
| 2,213,237 | 9/1940 | Brennan | 29—196.2 X |
| 2,338,091 | 1/1944 | Brennan | 29—481 X |
| 2,357,578 | 9/1944 | Brownback. | |
| 3,153,581 | 10/1964 | Hutchins | 29—504 X |
| 3,206,847 | 9/1965 | Keeleric | 29—498 X |
| 529,990 | 11/1884 | Wyckoff et al. | 29—191.4 |
| 1,280,908 | 10/1918 | Wales et al. | 29—191.4 |
| 2,691,815 | 10/1954 | Boessenkool | 29—497.5 |
| 2,753,623 | 7/1956 | Boessenkool | 29—497.5 |
| 3,132,418 | 5/1964 | Fulford | 29—497.5 |

JOHN F. CAMPBELL, *Primary Examiner.*

R. F. DROPKIN, *Assistant Examiner.*